350-3.6 SR
XR 3,719,420

March 6, 1973 S. J. KRULIKOSKI, JR., ET AL 3,719,420

METHOD AND APPARATUS FOR MEASURING PARALLAX BETWEEN POINTS ON STEREO IMAGES USING A FOURIER TRANSFORM HOLOGRAM OF ONE OF THE IMAGES

Filed May 13, 1971 2 Sheets-Sheet 1

INVENTORS
STANLEY J. KRULIKOSKI, JR.
JUAN C. DAWSON
BY John S. Bell
ATTORNEY

3719420
OR IN 356/2

METHOD AND APPARATUS FOR MEASURING PARALLAX BETWEEN POINTS ON STEREO IMAGES USING A FOURIER TRANSFORM HOLOGRAM OF ONE OF THE IMAGES

Filed May 13, 1971

2 Sheets-Sheet 2

INVENTORS
STANLEY J. KRULIKOSKI, JR.
JUAN C. DAWSON
BY John S. Bell
ATTORNEY

United States Patent Office 3,719,420
Patented Mar. 6, 1973

3,719,420

METHOD AND APPARATUS FOR MEASURING PARALLAX BETWEEN POINTS ON STEREO IMAGES USING A FOURIER TRANSFORM HOLOGRAM OF ONE OF THE IMAGES

Stanley J. Krulikoski, Jr., 214 Meridan, Dearborn, Mich. 48124, and Juan C. Dawson, 1393 E. Easter Circle, Littleton, Colo.

Filed May 13, 1971, Ser. No. 142,962
Int. Cl. G01c *11/12*
U.S. Cl. 356—2 16 Claims

ABSTRACT OF THE DISCLOSURE

The method and apparatus of this invention can be used to measure parallax between points of stereo images that are rotated with respect to each other as well as coplanar stereo images. The parallax between conjugate points on first and second stereo images of a scene is measured by recording a Fourier transform hologram of the first stereo image and aligning the recorded hologram with the second stereo image. Measurements in image parallax are made by directing a thin beam of laser light to strike and be diffracted by a point or small area on the second stereo image. The spherical lens is positioned to receive the diffracted beam, form the Fourier transform of that beam, and direct the beam to strike the recorded hologram. The diffracted beam causes a product signal to propagate from the halogram. The direction of propagation of this product signal is measured to determine image parallax between the illuminated point of the second stereo image and the conjugate of that point of the first stereo image.

BACKGROUND OF THE INVENTION

(1) Field of the invention

Stereophotogrammetry, and more particularly, the measure of image parallax between conjugate points on two stereo images of a scene.

(2) Brief description of the prior art

There are a number of stereophotogrammetric devices that measure parallax and use the parallax measurements to calculate elevation. Pat. 3,267,286, assigned to the Bendix Corporation, illustrates an apparatus for measuring image parallax in which two transparent stereo images are aligned with each other and a thin beam of light is directed to pass through and be modulated by a point or small area of the stereo images so that the modulated beam represents that stereo image point. A spherical lens focuses the modulated beam onto an output plane. The position at which the modulated beam strikes the output plane depends upon the relative orientation of the two stereo images. In operation, the beam is scanned from point to point across the stereo images. For each point or small area illuminated by the beam, one of the stereo images is moved perpendicular to the beam in order to cause the modulated beam to strike the output plane at a predetermined position. The distance that the one stereo image must be moved in order to cause the modulated beam to strike the predetermined point on the output plane is a measure of the image parallax between the illuminated points on the stereo images. One primary drawback of this apparatus is that it is time consuming to move the stereo images with respect to each other whenever points on the stereo images at different elevations are illuminated to return the modulated beam to the predetermined position on the output plane.

Application Ser. No. 764,679, now U.S. Pat. No. 3,602,593 also assigned to the Bendix Corporation, describes a parallax measuring apparatus that does not require stereo images to be constantly moved and realigned. A one-dimensional Fourier transformation is taken of light transmitted through a narrow slit of one stereo transparency. The slit is perpendicular to the stereo base line of that transparency pair. The resulting light distribution is transmitted through a one-dimensional matched filter transparency. Particularly, the matched filter is a transparency representing the complex conjugate of the one-dimensional Fourier transform of the other stereo transparency. A one-dimensional Fourier transformation is taken of a portion of the light transmitted through the matched filter transparency to provide a light pattern that is a line representing the parallax of imagery along the narrow slit of the one stereo transparency. The primary drawback of this device is that if the positions of the stereo images during their formation, or in other words the positions of cameras used in forming those images, are rotated with respect to each other about the base line so that the stereo images are not coplanar, the device will provide a broken or segmented output line representing image parallax. It is impossible to determine which segment of the stereo transparency along the narrow slit is represented by any particular segment of a broken output line. This device will, therefore, only provide a meaningful output, or in other words an unbroken output line, only for stereo images that are coplanar and are not rotated with respect to each other.

SUMMARY OF THE INVENTION

The subject invention comprises a method and apparatus for determining parallax from images that are rotated with respect to each other as well as from coplanar stereo images. The subject invention provides parallax measurements very rapidly. There is no need to constantly move and realign stereo images in order to determine the parallax for different points in a scene. The subject invention provides a measurement of parallax by multiplying the Fourier transform of a point or small area on one stereo image with a Fourier transform hologram of a second stereo image. This multiplication causes a product or output signal to propagate from the hologram. The direction of propagation of the product signal is a measure of image parallax between the points or small area on the one stereo image and the conjugate of that point or small area on the other stereo image. As used herein, a Fourier transform hologram of a stereo image comprises a two-dimensional pattern, or information sequence representing such pattern, that includes the sum of two wave fields, one of which is a reference wave field from a point source, the other of which is the Fourier transform of a wave field representing the stereo image. A Fourier transform hologram of a stereo image represents both the amplitude and phase of the Fourier transformation of the stereo image. Or, expressed differently, a Fourier transform hologram of a stereo image is an interference pattern representing the X and Y coordinates of each point on that stereo image.

Apparatus for recording a Fourier transform hologram of a partially transparent stereo image is illustrated herein. This apparatus includes means for directing a collimated beam of coherent wave energy, namely a beam of laser light, to strike a stereo image. The image modulates and thus transmits image information to the beam. A spherical lens is positioned to form the Fourier transform of the diffracted beam. A recording film is located in the back focal plane of the spherical lens, and a second beam of coherent wave energy capable of interfering with the modulated Fourier transformed beam is directed to intersect and interfere with the Fourier transformed beam proximate the recording medium. The angular orientation between the stereo image and the recording medium is carefully measured so that the orientation of the interference pattern on the recording medium is known. This measurement is made so that the image coordinates of the recorded hologram, or in other words the projection of the X and Y coordinate axes of the stereo image onto the recording medium during recording of the hologram, can subsequently be precisely aligned with the coordinate axes of a second stereo image of the scene.

An indication of image parallax is provided by apparatus illustrated herein that holds the second stereo image and the Fourier transform hologram of the one stereo image in alignment with each other. Apparatus for directing a thin beam of coherent wave energy, namely, laser light to strike and be modulated by a point or small area on the second stereo image. A spherical lens receives the modulated beam, forms the Fourier transform of that beam, and projects the Fourier transformed beam onto the recorded hologram. The Fourier transformed light striking the recorded hologram causes a product signal comprising a beam of light to propagate from the recorded hologram. The direction of propagation of this product signal is a measure of the image parallax between the point on the second stereo image struck by the laser beam and the conjugate of that point on the first stereo image. The apparatus illustrated herein for measuring this direction of propagation includes a lens for focusing the product signal or light beam onto an output plane and means for scanning a detector across the output plane. The position at which the detector receives the focused light or product signal is measured and used to calculate image parallax according to the formulae:

$$\Delta p_x = X\left(-\frac{f_t}{f_a}\right) \qquad (1)$$

$$\Delta p_y = Y\left(-\frac{f_t}{f_a}\right)$$

where:

$\Delta p_x$=X parallax;

$\Delta p_y$=Y parallax;

$f_a$=the focal length of the lens for focusing the product signal onto the output plane;

X,Y=the coordinates of the point at which the product signal strikes the output plane;

$f_t$=the focal length of the lens that forms the Fourier transform of the beam representing a point on the second stereo image.

BRIEF DESCRIPTION OF THE DRAWINGS

Further objects, features, and advantages of the invention, defined by the appended claims, will become apparent from a consideration of the following description and accompanying drawings in which:

DETAILED DESCRIPTION OF THE PREFERRED EMBODIMENTS

Figure 1:
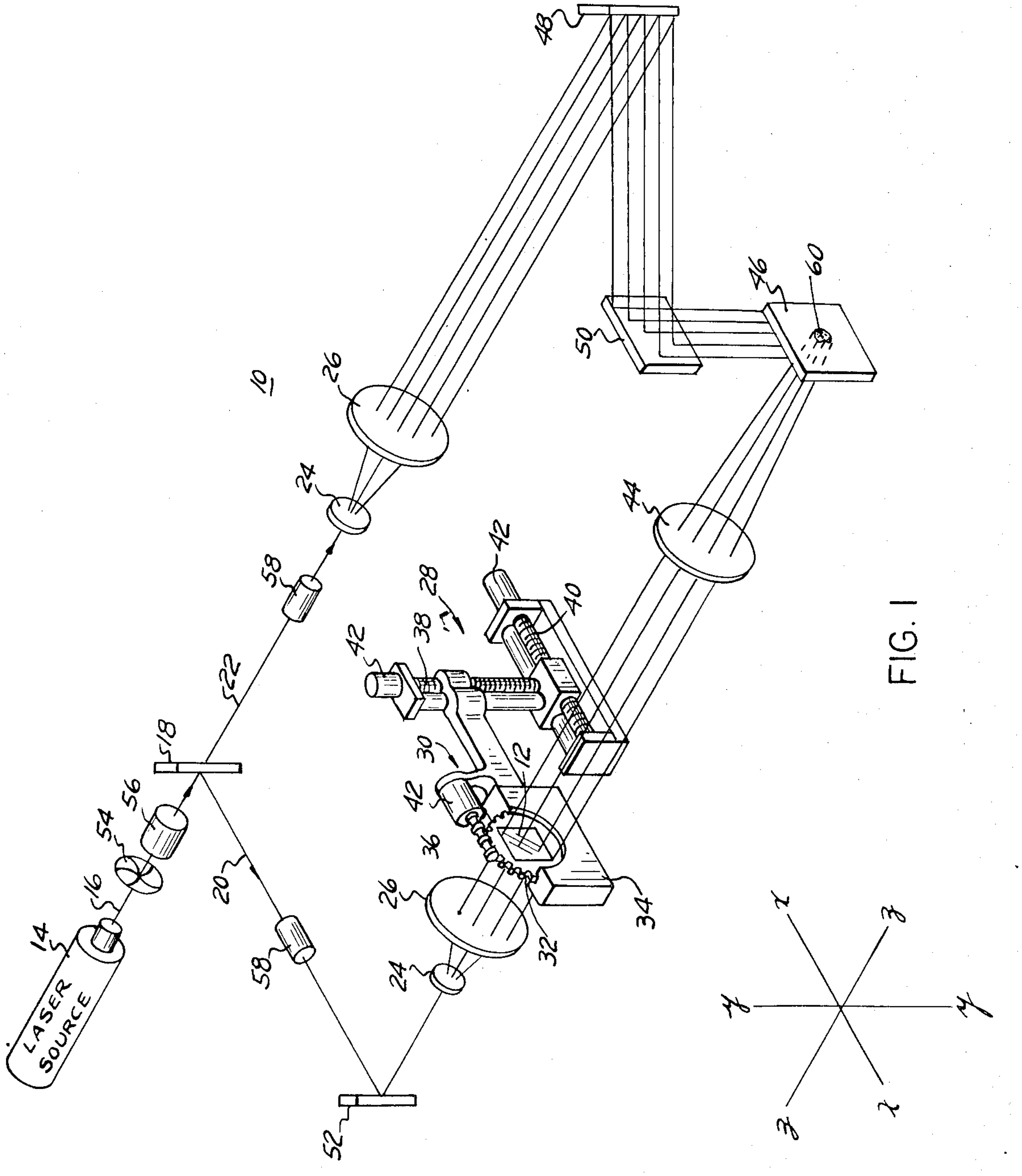
FIG. 1 is a perspective, schematic view of apparatus for recording a Fourier transform hologram of a transparent stereo image such as a stereo image recorded on photographic film.

FIG. 1 illustrates an apparatus 10 for recording a Fourier transform hologram of a transparent first stereo image 12 of a scene. The apparatus 10 includes a laser source 14 which projects a thin laser beam 16 against a beam splitter 18. The beam splitter provides two output beams 20 and 22. Identical objective lenses 24 and collimating lenses 26 are disposed in the beams 20 and 22 in order to expand and collimate those beams. The stereo image 12 is disposed to receive and modulate collimated beam 20. Image 12 is mounted in a carriage assembly 28 which comprises a mounting plate 30 having an inner section 32 for holding the stereo image 12 which is rotatably mounted in an outer portion 34. The two sections 32 and 34 of the mounting plate 30 thus permit the stereo image 12 to be rotated around the axis of collimated beam 20 by operation of a rotating screw 36. Mounting plate 30 is attached to a Y axis screw 38 for moving the stereo image 12 along the illustrated Y axis which is in turn mounted to an X axis screw 40 for moving the stereo image along the illustrated X axis. The screws 36, 38, and 40 are driven by motive means 42 such as servo motors or hand wheels. A spherical lens 44 is positioned downstream from stereo image 12 to receive the modulated light beam 20 from that stereo image and form the Fourier transform of that received beam. A recording film 46 is located at the back focal plane of spherical lens 44. Two mirrors 48 and 50 direct reference beam 22 to intersect and interfere with light from lens 44 proximate the recording film 46. The two mirrors 48 and 50 are provided so that beams 20 and 22 will have approximately the same path length and thus be able to interfere with each other and thus provide a hologram.

A shutter 54 is positioned to receive laser light from the source 14 and to block the propagation of laser light from that source when no hologram is being recorded, such as during the preliminary orientation of stereo image 12. Film 46 will not be overexposed by light striking that film at other times. A retardation type laser light modulator 56 is disposed between shutter 54 and beam splitter 18 to rotate the direction of polarization of beam 16 and thereby rotate the direction of polarization of beams 20 and 22. It is necessary to rotate the direction of polarization of these two beams because the stereo image 12, or more precisely the photographic film upon which the image is recorded, will rotate the direction of polarization of all laser light striking that film except laser light polarized in one predetermined direction. The particular polarization direction that will not be rotated by the photographic film is different for different films and is determined during the making of the film. If the direction of polarization of beam 20 is rotated with respect to the direction of polarization of beam 22, the coherence between those two beams will be destroyed and they will not interfere. Modulator 56 is thus used to polarize beams 20 and 22 in a direction such that the direction of polarization of beam 20 will not be rotated by stereo image 12. A separate intensity control 58 is disposed in each of the beams 20 and 22 so that the reference beam 22 can be provided with the same intensity at the recording film 46 as that of the beam 20 and will not be more intense than beam 20 because of any attenuation of beam 20 caused by stereo image 12. Intensity control 58 also permits formation of a hologram having an intensity approximately equal to the intensity of a second stereo image of the scene represented by stereo image 12. This second stereo image is compared with the hologram recorded by the apparatus 10 to determine image parallax.

In operation, stereo image 12 is mounted in the carriage 28, and the position of the stereo image is adjusted using screws 36, 38, and 40 so that the collimated beam 20 from lens 26 illuminates the entire stereo image 12. The orientation of stereo image 12 also provides a precise alignment between that stereo image and the recording film 46. This alignment is measured by the operator so that he will know the orientation from the Fourier transformed hologram recorded on film 46, or in other words he will know the orientation of the projection of the X and Y coordinate axes of stereo image 12 onto the recording film 46. This orientation of the stereo image 12 and recording film 46 must be determined in order to permit the operator to subsequently align the Fourier transformed hologram of stereo image 12 with a second stereo image of the scene represented by the stereo image 12 and measure parallax.

An operator then adjusts the direction of polarization of beams 20 and 22 with the modulator 56. The beams are polarized in a direction such that the direction of polarization of beam 20 will not be rotated by image 12 by placing an analyzer (not shown) proximate film 46 to receive beam 20. An analyzer is a well-known apparatus that has a predetermined direction of polarization and that will not transmit polarized light having a polarization direction offset by 90° from the predetermined direction. The analyzer is positioned so that it will not transmit light polarized in the direction provided by modulator 56. If a signal is received downstream from the analyzer, it is known that image 12 has rotated the direction of polarization of beam 20 and that the beam 20 is not polarized in the one direction in which it will be unaffected by image 12. The direction of polarization provided by modulator 56 is rotated, as is the orientation of the analyzer so that it will not transmit light polarized in the direction provided by modulator 56. When no light is transmitted from the analyzer, it is known that beams 20 and 22 have a polarization direction such that image 12 will not rotate the direction of polarization of beam 20 and thus destroy the coherence between those two beams.

The operator then makes an appropriate adjustment of the intensity controls 58, and activates shutter 54 to permit light to propagate to the recording film 46. Stereo image 12 diffracts collimated beam 20 and thus transmits image information to that beam. The diffracted beam strikes spherical lens 44 which forms the Fourier transform of that diffracted beam. Light from lens 44 is directed toward the recording film 46. The reference beam 22 is directed by mirrors 48 and 50 to intersect and interfere with beam 20 proximate recording film 46 and thereby form an interference pattern or hologram 60 which is recorded on the film 46. As can be seen from FIG. 1, since the recording film 46 is located at the back focal plane of lens 44, the diffracted, Fourier transformed beam 18 strikes only a point or small area. The Fourier transform hologram 60 is thus recorded on only a small portion of film 46. However, the X and Y coordinates of each point on the stereo image 12 are represented by recorded hologram 60.

Figure 2:
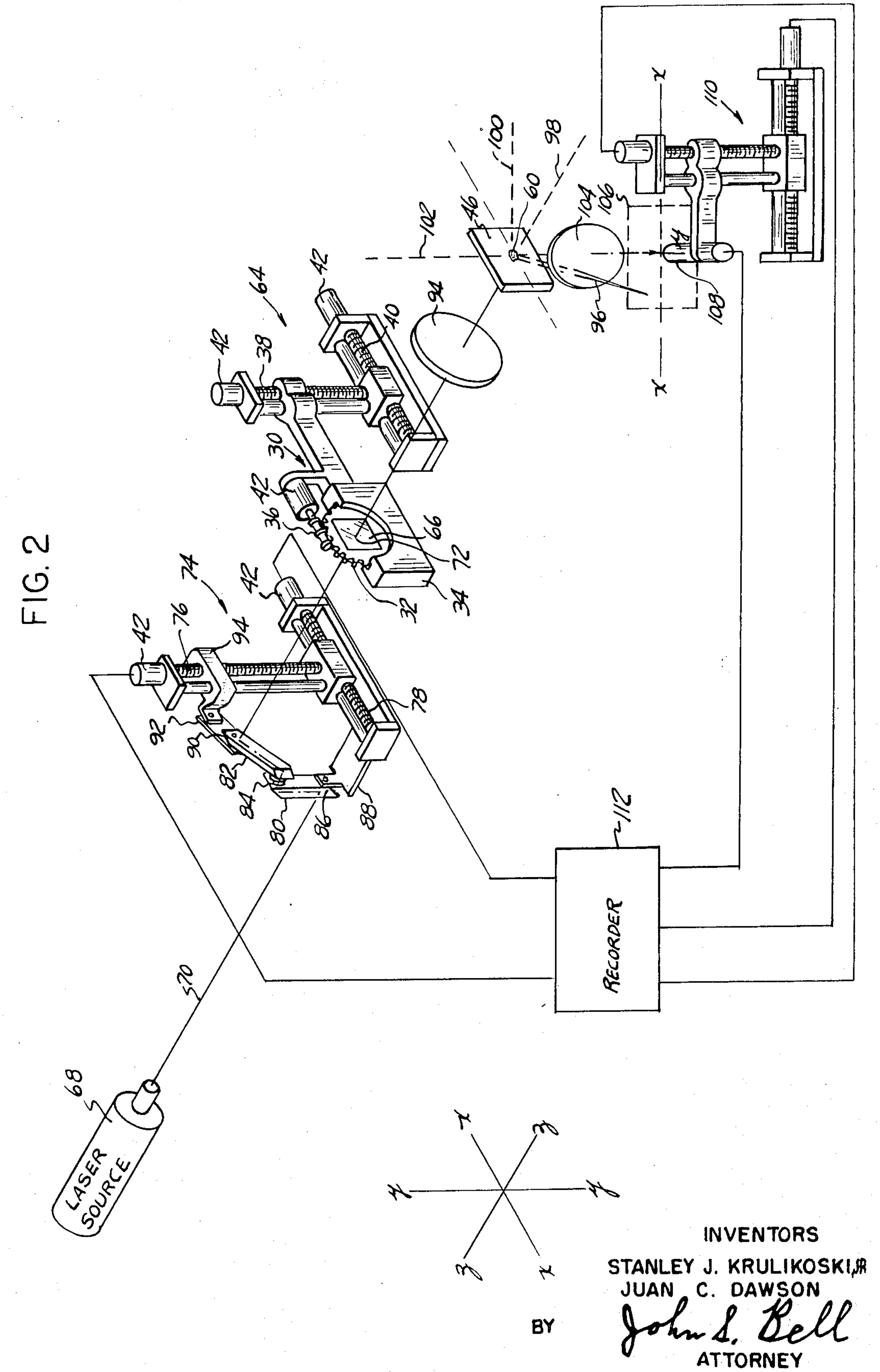
FIG. 2 is a perspective, schematic view of an apparatus for using the Fourier transformed hologram produced by the apparatus of FIG. 1 and a second stereo image to indicate image parallax.

An apparatus 62 for using the Fourier transformed hologram 60 recorded by the apparatus 10 to provide an output indicating image parallax is illustrated in FIG. 2. The apparatus 62 include a carriage assembly 64 for holding a second stereo image 66. Stereo image 66 represents the scene represented by stereo image 12 from a vantage point different from the vantage point of stereo image 12. Carriage mechanism 64 is identical to the carriage mechanism 28 illustrated in FIG. 1 for holding stereo image 12. The carriage mechanism 64 permits an operator to precisely align stereo image 66 with recorded hologram 60. A laser source 68 provides a thin beam of laser light 70 which strikes stereo image 66 at a point or small area such as point 72. A carriage mechanism 74 for scanning beam 70 across stereo image 66 is disposed between that stereo image and the laser source 68. The carriage mechanism 74 includes a Y axis screw 76 mounted on an X axis screw 78. Two Rhombic prisms 80 and 82 are joined to each other by a hollow coupling sleeve 84 that permits those prisms to rotate with respect to each other. End 86 of prism 80 is rotatably fastened to carriage 74 by a support member 88 and is not allowed to translate. End 88 is positioned to receive beam 70 from laser source 68. Prism 80 transmits the received beam 70 through the hollow coupling 84 into prism 82. The beam is transmitted through prism 82 and projected onto the stereo image 66 from end 90 of prism 82. The end 90 of prism 82 is rotatably attached by a second support member 92 to a carriage 94 which rides on the Y axis screw 76. The end 90 of prism 82 can thus be moved by moving the X and Y axis screws 76 and 80 to scan beam 70 across stereo image 66 and cause the beam to strike any desired point on that stereo image.

A spherical lens 94 is positioned to receive light from the stereo image 66, form the Fourier transform of that received light, and focus the light onto the hologram 60. The hologram 60 is located in the back focal plane of lens 94. The Fourier transformed beam 70 from lens 94 which strikes hologram 60 is multiplied by that hologram and causes a product signal 96 to propagate from that hologram. Product signal 96 is a conjugate image signal. The Fourier transformed beam 70 striking hologram 60 also causes several other product signals to propagate from the hologram. These signals propagate along lines 98 and 100. These other signals are thus spatially displaced from product signal 96 sufficiently so that they do not interfere with that signal or provide any misleading indications to apparatus for measuring the direction of propagation of signal 96. Product signal 96 propagates in the general direction of line 102, and the displacement of the direction of propagation of signal 96 from line 102 is an indication of image parallax. Line 102 passes through hologram 60, or in other words through the center of recording film 46, and strikes that film at an angle measured with respect to film 46 that is equal to the angle at which reference beam 22 struck film 46 during recording of the hologram. In order to measure the direction of propagation of product signal 96, a lens 104 is disposed along line 102 to focus signal 96 to a point on an output plane 106. Output plane 106 is perpendicular to line 102. The position at which signal component 96 strikes plane 106 is measured by a photodetector 108 which is mounted on a carriage mechanism 110 for scanning detector 108 across output plane 106. Detector 108 provides an electric output signal to a recording apparatus 112 upon receipt of the signal 96. Recorder 112 records the position of the X and Y axes screws of carriage mechanism 110 upon receipt of the signal from photodetector 108 and thus records the X and Y coordinates of the position at which detector 108 receives signal 96. The X and Y coordinates are measured with respect to the position at which line 102 intercepts plane 106. The displacement of signal 96 along the X axis of plane 106 is a measure of X parallax, and a displacement along the Y parallax of plane 106 is a measure of Y parallax. The larger the displacement of signal 96 from the coordinate origin of the axis of plane 106, the larger the image parallax between the illuminated point 72 on stereo image 66 and the conjugate of that point on stereo image 12. Recorder 112 also receives signals from the drive motors of carriage mechanism 74 and uses these signals to provide outputs indicating which points in the scene of stereo image 66 are represented by parallax measurements.

In operation, stereo image 66 is mounted in carriage mechanism 64 which is adjusted to align stereo image 66 with recorded hologram 60. That is, the X and Y coordinate axes of image 66 are aligned with the X and Y coordinate axes of recorded hologram 60 so that the two coordinate axes are not rotated with respect to each other. This alignment is measured with respect to the Z axis of either stereo image 66 or hologram 60, or in other words an axis perpendicular to the plane of either stereo image 66 or hologram 60. After stereo image 66 and hologram 60 are aligned, laser beam 70 from source 68 is directed through prisms 80 and 82 to strike point or small area 72 on stereo image 66. Image 66 modulates beam 70 and thus transmits image information representing point 72 to that beam. The modulated beam strikes spherical lens 94 which forms the Fourier transform of that modulated beam and directs the beam onto recorded hologram 60. The Fourier transformed beam 70 striking hologram 60 causes signal 96 to propagate from the hologram. Lens 104 focuses signal 96 onto output plane 106. The direction of propagation of signal 96, or in other words the difference between the position at which line 102 intercepts plane 106 and the position at which signal 96 strikes that plane, is measured by detector 108 which is scanned across plane 106. Detector 108 provides an output signal to recording apparatus 112 upon a receipt of signal 96. The signal transmitted to recording apparatus 112 from detector 108 causes that recording apparatus to record the positions of the X and Y axes screws of carriage mechanism 110 and thereby record the X and Y coordinates of detector 108. Measured X and Y coordinates of signal 96 are used to calculate parallax according to Equation 1 above. Parallax measurements are made for various points on the stereo image 66 by moving prisms 80 and 82 to scan beam 70 across stereo image 66. Points on a stereo image representing points in a scene at different elevations will have different amounts of parallax and thus cause component signal 96 to propagate in different directions. These directions are measured to determine the differences in parallax and elevation of the various points.

Having thus described one embodiment of this invention, a number of modifications of the preferred embodiment may be made by those skilled in the art. As one example of a modification to the illustrated apparatus, the recording film 46 illustrated in FIGS. 1 and 2 can be replaced with a material such as a photochromic or a photopolymer film, and the systems shown separately in FIGS. 1 and 2 can be combined to provide a system for providing real time measurements of image parallax.

Therefore, what is claimed is:

1. A system for measuring parallax betwen conjugate points on first and second stereo images of a scene comprising:

means for directing a thin beam of coherent wave energy to strike and be modulated by a point on said first stereo image, said modulated beam representing said point on said first stereo image;

means for forming the Fourier transform beam of said modulated beam;

a Fourier transform hologram representing the X and Y coordinates of each point of said second stereo image disposed to receive said modulated, Fourier transformed beam, said received beam causing an output signal comprising the product of said Fourier transformed beam and said hologram to propagate from said hologram; and means for measuring the direction of propagation of said product signal, the direction of propagation being a measure of image parallax of said point.

2. The system of claim 1 in which said hologram comprises an interference pattern representing said second stereo image and having X and Y image coordinates, and the X and Y image coordinates of said first stereo image are in angular alignment with the X and Y image coordinates of said hologram, said angular alignment to be measured with respect to an axis perpendicular to both said X and Y axes of said first stereo image.

3. The system of claim 2 in which said product is a conjugate image signal.

4. The system of claim 3 in which:

said Fourier transform hologram comprises an interference pattern recorded on a recording surface, said interference pattern being recorded by causing a first beam of coherent wave energy representing said second stereo image and a reference beam of mutually coherent wave energy with said first beam to intercept each other proximate said recording surface;

said product signal intercepts an (X, Y) coordinate output plane at one point; and said measuring means includes means for measuring the X coordinate of the point at which said product signal intercepts said output plane to determine the X parallax of said point on said first stereo image, and means for measuring the Y coordinate of the point at which said product signal intercepts said output plane to determine the Y parallax of said point on said first stereo image.

5. The system of claim 4 in which:

said ouptut plane is disposed perpendicular to a line passing through the coordinate origin of said recorded hologram at an angle equal to the angle at which said reference beam strikes said recording surface during the recording of said hologram;

the X and Y coordinates of said output plane are angularly aligned with the X and Y coordinates of said Fourier transform hologram, said angular alignment being measured with respect to an axis perpendicular to said recorded hologram;

the coordinate origin of the X and Y coordinate axes of said output plane is defined by the position at which said line intercepts said output plane, and said measuring means provides said X and Y coordinate position measurements with respect to said coordinate origin of said axes of said output plane.

6. The system of claim 5 in which:

said thin beam of coherent wave energy comprises a thin beam of laser light;

said means for forming the Fourier transform of said modulated thin beam comprises a spherical lens;

said Fourier transform hologram comprises an optic diffraction pattern recorded on a photographic film and disposed in the back focal plane of said spherical lens; and the system includes a second spherical lens disposed along said line for focusing said product signal to said output plane.

7. The system of claim 5 further including means for scanning said thin beam across said first stereo image to thereby provide output signals indicating the parallax for different points of said stereo image.

8. A method for measuring parallax between first and second stereo images of a scene comprising the steps of:

providing a Fourier transform hologram representing the X and Y coordinates of each point of said first stereo image;

forming the Fourier transform of a point on said second stereo image;

multiplying said Fourier transform hologram of said first stereo image and said Fourier transform of said point on said second stereo image to thereby form a product signal; and measuring the direction of propagation of said product signal, the direction of propagation being a measure of image parallax for said point.

9. The method of claim 8 in which said providing a Fourier transform hologram of said first stereo image comprises the steps of:

polarizing a first beam of coherent wave energy in a predetermined direction such that said direction of polarization will be unaltered by the striking of said first stereo image by said first beam;

directing said first beam to strike and be modulated by said first stereo image, said modulated beam representing said first stereo image;

positioning lens means to form the Fourier transform of said modulated beam;

placing a recording medium proximate the back focal plane of said lens means; and directing a reference beam of coherent wave energy capable of interfering with said modulated beam to intersect said modulated beam proximate said recording medium to thereby provide said Fourier transform hologram on said recording medium.

10. The method of claim 8 in which:

said providing a Fourier transform hologram provides a Fourier transform hologram having X and Y image coordinates angularly aligned with the X and Y image coordinates of said second stereo image, said angular alignments being measured with respect to an axis perpendicular to both said X and Y axes of said second stereo image; and said multiplying comprises:

directing a thin beam of coherent wave energy to strike and be modulated by said point on said second stereo image, said modulated beam representing said point on said first stereo image;

forming the Fourier transform of said modulated thin beam; and directing said Fourier transformed thin beam to strike said hologram, said striking of said hologram causing an output signal comprising the product of said Fourier transformed thin beam and said hologram to propagate from said hologram.

11. The method of claim 10 in which:

said product signal comprises a conjugate image signal, and said measuring the direction of propagation comprises measuring the direction of propagation of said conjugate image signal.

12. The method set forth in claim 11 in which:

said conjugate image signal intercepts an (X,Y) coordinate output plane at one point; and said measuring comprises the measuring of the X and Y coordinates of the point at which said conjugate image signal intercepts said plane to determine the X and Y parallax respectively of said point on said second stereo image.

13. The method of claim 11 in which:

said output plane is perpendicular to a line passing through the coordinate origin of said recorded hologram at an angle equal to the angle at which said reference beam strikes said recording surface during said recording of said hologram, said direction being measured with respect to said recorded hologram;

the X and Y coordinate axes of said output plane are angularly aligned with said X and Y coordinates of said Fourier transform hologram, and angular alignment being measured with respect to an axis perpendicular to said recorded hologram;

the coordinate origin of said X and Y axes of said output plane is located at the position at which said line intercepts said hologram; and said X and Y coordinate measurements of the point at which said conjugate image signal intercepts said output plane are made with respect to said coordinate origin.

14. The method set forth in claim 13 further including the step of focusing said conjugate image signal onto said output plane.

15. The method set forth in claim 14 in which said measurements of position at which said output signal strikes said output plane are used to calculate the X and Y parallax of said second image point using the equation:

$$\Delta p_x = X\left(-\frac{f_t}{f_a}\right)$$

$$\Delta p_y = Y\left(-\frac{f_t}{f_a}\right)$$

where:

$\Delta p_x$=X parallax $\Delta p_y$=Y parallax

X,Y=the coordinates of the position at which said conjugate image product signal strikes the output plane;

$f_a$=the focal length of the means for focusing the conjugate image product signal onto the output plane; and $f_t$=the focal length of the means for forming the Fourier transform of a point on said second stereo image.

16. The method set forth in claim 10 further including the step of scanning said thin beam across said first stereo image to thereby obtain parallax measurements for different points on said stereo image.

References Cited

UNITED STATES PATENTS

| | | | |
|---|---|---|---|
| 3,568,863 | 5/1971 | Farrand | 356—2 |
| 3,602,593 | 8/1971 | Krulikoski, Jr. et al. | 356—2 |

RONALD L. WIBERT, Primary Examiner

F. L. EVANS, Assistant Examiner

U.S. Cl. X.R.

350—3.5, 162 SF